(12) United States Patent
Tamura et al.

(10) Patent No.: US 11,045,864 B2
(45) Date of Patent: Jun. 29, 2021

(54) METHOD FOR PRODUCING FORGED CRANKSHAFT

(71) Applicant: NIPPON STEEL & SUMITOMO METAL CORPORATION, Tokyo (JP)

(72) Inventors: Kenji Tamura, Tokyo (JP); Junichi Okubo, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 256 days.

(21) Appl. No.: 16/061,398

(22) PCT Filed: Dec. 21, 2016

(86) PCT No.: PCT/JP2016/088137
§ 371 (c)(1),
(2) Date: Jun. 12, 2018

(87) PCT Pub. No.: WO2017/110887
PCT Pub. Date: Jun. 29, 2017

(65) Prior Publication Data
US 2020/0114414 A1 Apr. 16, 2020

(30) Foreign Application Priority Data
Dec. 25, 2015 (JP) .............................. JP2015-255430

(51) Int. Cl.
*B21K 1/08* (2006.01)
*F16C 3/08* (2006.01)

(52) U.S. Cl.
CPC .................. *B21K 1/08* (2013.01); *F16C 3/08* (2013.01); *F16C 2220/46* (2013.01)

(58) Field of Classification Search
CPC .......... B21K 1/08; F16C 3/08; F16C 2220/46; Y10T 29/17; Y10T 29/49286
See application file for complete search history.

(56) References Cited

U.S. PATENT DOCUMENTS 2,653,373 A * 9/1953 Brauchler ................ B21K 1/08
29/6.01
2,891,299 A * 6/1959 Robra ...................... B21K 1/08
29/6.01
(Continued)

FOREIGN PATENT DOCUMENTS

| FR | 1121589 | 8/1956 | |
| JP | 58077733 A * | 5/1983 | ............... B21K 1/08 |

(Continued)

*Primary Examiner* — Jason L Vaughan
(74) *Attorney, Agent, or Firm* — Clark & Brody LP

(57) ABSTRACT

Disclosed is a method for producing a forged crankshaft. This production method includes: a pressing step of pressing a part in a longitudinal direction (first region) of a bar-like member with a pair of first dies, thereby decreasing a cross sectional area of the first region; and a decentering step of decentering a second region of the bar-like member with a second die with the first region being held. The second region is at least a part of the region of the bar-like member excepting the first region. The decentering direction by the second die is a direction perpendicular to each of the pressing direction by the first dies and the longitudinal direction of the bar-like member.

7 Claims, 10 Drawing Sheets

(56) References Cited

U.S. PATENT DOCUMENTS

| | | | | | |
|---|---|---|---|---|---|
| 2,911,705 | A | * | 11/1959 | Vom Bovert | ............ B21K 1/08 29/6.01 |
| 3,129,488 | A | * | 4/1964 | Robra | ...................... B21K 1/08 29/888.08 |
| 3,570,298 | A | * | 3/1971 | Detzel et al. | .............. B21J 5/02 29/6.01 |
| 3,650,143 | A | * | 3/1972 | Ruget | ...................... B21K 1/08 72/412 |

FOREIGN PATENT DOCUMENTS

| | | | | |
|---|---|---|---|---|
| JP | 58192645 | A | * 11/1983 | ............... B21K 1/08 |
| JP | 59-45051 | | 3/1984 | |
| JP | 59-45052 | | 3/1984 | |
| JP | 60003936 | A | * 1/1985 | ............... B21K 1/08 |
| JP | 62-244545 | | 10/1987 | |
| JP | 02-255240 | | 10/1990 | |
| JP | 05-228574 | | 9/1993 | |
| JP | 2001-105087 | | 4/2001 | |
| WO | 2014/038183 | | 3/2014 | |

\* cited by examiner

PRIOR ART

IVC-IVC

IVD-IVD

US 11,045,864 B2

METHOD FOR PRODUCING FORGED CRANKSHAFT

TECHNICAL FIELD

The present invention relates to a method for producing a crankshaft by hot forging.

BACKGROUND ART

A crankshaft is essential in a reciprocating engine for an automobile, a motorcycle, an agricultural machine, a ship, or the like for deriving power by transforming reciprocating movement of a piston into rotational movement. A crankshaft can be produced either by die forging or casting. When high strength and high rigidity are required for a crankshaft, a crankshaft produced by die forging (hereinafter referred to as a forged crankshaft) is often used.

In general, a starting material for a forged crankshaft is a billet. Such a billet has a circular or rectangular cross section, and its cross sectional area is constant over the entire length. A production process of a forged crankshaft includes a preforming process, a die forging process, and a flash-trimming process. As required, a coining process is added after the flash-trimming process. Typically, the preforming process includes a roll forming and bend forging processes, and the die forging process includes a rough forging and finish forging processes.

FIGS. 1A to 1F are schematic diagrams to illustrate a conventional common production process of a typical forged crankshaft. FIG. 1A shows a billet, FIG. 1B a rolled preform, FIG. 1C a bent preform, FIG. 1D a rough forged preform, FIG. 1E a finish forged preform, and FIG. 1F a crank shaft (final product), respectively. A forged crankshaft 1 illustrated in FIG. 1F is to be mounted on a 4-cylinder engine. The crankshaft 1 includes five journals J1 to J5, four pins P1 to P4, a front part Fr, a flange part F1, eight crank arms (hereinafter, simply referred to as "arms") A1 to A8, and eight counterweights (hereinafter, simply referred to as "weights") W1 to W8. The arms A1 to A8 connect the journals J1 to J5 with the pins P1 to P4, respectively. Further, all the arms A1 to A8 integrally include weights W1 to W8, respectively.

Hereinafter, when collectively referring to the journals J1 to J5, the pins P1 to P4, the arms A1 to A8, and the weights W1 to W8, respectively, their symbols are also denoted as "J" in the journals, "P" in the pins, "A" in the arms, and "W" in the weight parts. A pin P and a set of arms A (including weights W) connecting to the pin P are collectively referred to as a "throw".

In the production method shown in FIGS. 1A to 1F, the forged crankshaft 1 is produced as described below. First, a billet 2 having a predetermined length as shown in FIG. 1A is heated in a heating furnace (for example, an induction heating furnace or a gas atmosphere heating furnace, etc.) and thereafter subjected to roll forming. In the roll forming process, the billet 2 is rolled by use of, for example, a grooved roll, thereby decreasing the cross sectional area at a part in the longitudinal direction of the billet 2. As a result, the volume of the billet 2 is distributed in the longitudinal direction to obtain a rolled preform 3 which is an intermediate starting material (see FIG. 1B). Next, in a bend forging process, the rolled preform 3 is partly pressed in a direction perpendicular to the longitudinal direction, thereby decentering a part in the longitudinal direction of the rolled preform 3. As a result, the volume of the rolled preform 3 is distributed, thereby obtaining a bent preform 4 which is a further intermediate starting material (see FIG. 1C).

Successively, in the rough forging process, the bent preform 4 is subjected to press forging by use of a pair of dies (an upper die and a lower die), to obtain a rough forged preform 5 (see FIG. 1D). The resulting rough forged preform 5 has an approximate shape of the crankshaft (final product). Further, in the finish forging process, the rough forged preform 5 is subjected to press forging by use of a vertical pair of dies, thereby obtaining a finish forged preform 6 (see FIG. 1E). The resulting finish forged preform 6 has a shape corresponding to that of the crankshaft as the final product. During the rough forging and finish forging, excess material flows out from a gap between the upper and lower dies, forming flash. As a result, both of the rough forged preform 5 and the finish forged preform 6 have a pronounced flash B around its circumference.

In the flash-trimming process, for example, with the finish forged preform 6 having a flash being sandwiched between a pair of dies, the flash B is punched off by use of a tool die. As a result, the flash B is removed from the finish forged preform 6, thereby obtaining a flash-free forged preform. The flash-free forged preform has an approximately same shape as that of the forged crankshaft 1 as shown in FIG. 1F.

In the coining process, principal parts of the flash-free finish forged preform are pressed slightly from upward and downward with dies so that the flash-free finish forged preform is reformed to have the same geometry as that of the final product. Here, the principal portions of the flash-free finish forged preform include, for example, shaft portions such as the journals J, the pins P, the front part Fr, and the flange part F1, and further the arms A and the weights W. Thus, the forged crankshaft 1 is produced.

The production process shown in FIGS. 1A to 1F can be applied to various crankshafts without being limited to a 4-cylinder 8-counterweight crankshaft as shown in FIG. 1F. For example, it can be applied to a 4-cylinder 4-counterweight crankshaft.

In the case of a 4-cylinder 4-counterweight crankshaft, some of the arms A of the eight arms A have integrally a weight W. For example, the foremost first arm A1, the rearmost eighth arm A8, and middle two arms (the fourth arm A4, the fifth arm A5) have weights W. Moreover, the remaining arms, specifically, the second arm A2, the third arm A3, the sixth arm A6 and the seventh arm A7 have no weight. Hereinafter, an arm having no weight is also referred to as a "weightless arm".

Further, the production process is similar even for the crankshafts to be mounted on a 3-cylinder engine, a series 6-cylinder engine, a V-type 6-cylinder engine, an 8-cylinder engine, or the like. It is noted that when adjustment of layout angle of the pin is necessary, a twisting process is added after the flash-trimming process.

In the production of such a forged crankshaft, it is desirable to improve material yield by decreasing the flowing out of flash during die forging. Here, the term, material yield means a fraction (percentage) of the volume of the forged crankshaft (final product) to that of the billet. This material yield can be improved by facilitating distribution of volume in the preforming.

Techniques concerning preforming have been described in Japanese Patent Application Publication No. 2001-105087 (Patent Literature 1), Japanese Patent Application Publication No. H02-255240 (Patent Literature 2), and Japanese Patent Application Publication No. 62-244545 (Patent Literature 3).

Patent Literature 1 describes a preforming method using a pair of upper and lower dies. In the preforming method, when a bar-like workpiece is pressed by the upper and lower dies, a part of the workpiece is elongated thereby decreasing its cross sectional area, and concurrently another part in continuous with the part is moved in a sliding manner to be decentered. The preforming method described in Patent Literature 1 states that it can provide a preforming method requiring less facility cost, since it allows to perform elongation and bending at the same time.

The preforming described in Patent Literature 2 uses a 4-pass high speed rolling facility instead of conventional 2-pass roll forming. In that preforming, it is proposed to determine the cross sectional area of a rolled preform according to the distribution of cross sectional areas of the weight, the arm, and the journal of a forged crankshaft (final product). Patent Literature 2 states that this allows improvement of material yield.

In the preforming described in Patent Literature 3, volume is distributed in the axial direction and radial direction by a cross rolling method, thereby obtaining an axially nonsymmetric intermediate starting material. In the cross rolling method, a round-bar-like starting material is pressed with two dies, and volume is distributed by form rolling action of the dies.

CITATION LIST

Patent Literature

Patent Literature 1: Japanese Patent Application Publication No. 2001-105087
Patent Literature 2: Japanese Patent Application Publication No. H02-255240
Patent Literature 3: Japanese Patent Application Publication No. 62-244545
Patent Literature 4: International Application Publication No. WO2014/038183

SUMMARY OF INVENTION

Technical Problem

In the production of a forged crankshaft, it is desired as described above to decrease flowing out of flash during die forging, thereby improving material yield. The material yield can be improved by facilitating distribution of volume in preforming.

As in the case of the production process shown in FIGS. 1A to 1F, the preforming may consist of roll forming and bend forging. In such a case, it is conceivable to facilitate distribution of volume by the following method.

(1) In the roll forming, the cross sectional area is decreased in a region which is to be a journal, of a billet.
(2) In the subsequent bend forging, a region which is to be a pin and a region which is to be an arm having a set of weights in continuous with the pin are partially pressed to be decentered toward a region which is to be a weight.

It is noted that hereinafter, a region which is to be a journal will be also referred to as a "journal-corresponding part", a region which is to be a pin as a "pin-corresponding part", a region which is to be a pin-corresponding part and a set of arms (including a region which is to be a weight) connected with the pin-corresponding part as a "throw-corresponding part", and a region which is to be an arm having a weight as an "weighted arm-corresponding part".

However, in the above described method, if the cross sectional area of the journal-corresponding part is significantly decreased by roll forming, material flow from the throw-corresponding part to the journal-corresponding part becomes inevitable when the throw-corresponding part is decentered by bend forging. Such material flow may cause a flaw (so called, overlap defect) around the journal-corresponding part. Moreover, such material flow will hinder the volume distribution during preforming. For that reason, when the preforming consists of roll forming and bend forging, a decreased amount of the cross sectional area of the journal-corresponding part in the roll forming and the decentering amount of the throw-corresponding part in the bend forging are not sufficient. As a result, it has been desired to further facilitate the distribution of volume.

In the preforming method described in Patent Literature 1, cross sectional area is decreased at a part of the bar-like workpiece and, at the same time, another part is decentered when pressing is performed by a pair of upper and lower dies. However, since decreasing of cross sectional area, and decentering are performed at the same time by a pair of upper and lower dies, the decreased amount of cross sectional area and the decentering amount are not sufficient. For that reason, it has been desired to further facilitate distribution of volume.

In the preforming method described in Patent Literature 2, since roll forming is used, it is not possible to decenter a part of the billet. As a result, the resulting rolled preform needs to be further subjected to bend forging, etc. In this case, as described above, the amount of decrease in cross sectional area and the decentering amount are not sufficient.

In the preforming method described in Patent Literature 3, volume is distributed in the axial direction and the radial direction by a cross rolling method. In the cross rolling method, a special facility is used instead of a press machine which is used in bend forging and die forging, etc. Moreover, in the cross rolling method, it is difficult to process multiple sites concurrently, and for example, a plurality of journal-corresponding parts and a plurality of throw-corresponding parts are to be processed successively. For that reason, the dies become large sized. As a result of these, the facility cost will increase.

It is an object of the present invention to provide a method for producing a forged crankshaft, which improves material yield by facilitating distribution of volume during preforming while suppressing increase in the facility cost.

Solution to Problem

A method for producing a forged crankshaft according to an embodiment of the present invention is a method for producing a forged crankshaft including a plurality of journals which define a rotation center, a plurality of pins which are decentered with respect to the plurality of journals, and a plurality of crank arms which each connect the plurality of journals with the plurality of pins, respectively. At least one of the plurality of crank arms is a weighted arm having a counterweight. The production method comprises: a pressing step of pressing a first region, which is a part in a longitudinal direction of a bar-like member, with a pair of first dies, to decrease a cross sectional area of the first region; and a decentering step of decentering a second region of the bar-like member with a second die while the pressed first region is held by the first dies. The above described second region is at least a part of a region of the bar-like member excepting the first region. The decentering direction by the second die is a direction perpendicular to each of the pressing direction by the first dies and the longitudinal direction of the bar-like member.

Advantageous Effects of Invention

According to the production method of the present invention for producing a forged crankshaft, it is possible to suppress material flow from a second region which is to be decentered to a first region which has been pressed and held. For that reason, the distribution of volume is facilitated, thereby improving material yield. Moreover, the production method of the present invention can be performed by using a press machine. Therefore, it is possible to suppress increase in facility cost.

BRIEF DESCRIPTION OF DRAWINGS

FIG. 14A is a schematic diagram to show another exemplary forged crankshaft which is produced by the production method of the present embodiment.

FIG. 14B is a schematic diagram to show an exemplary bar-like member which has been pressed in the production process of a forged crankshaft shown in FIG. 14A.

FIG. 14C is a schematic diagram to show an exemplary preform 52 obtained by decentering the bar-like member shown in FIG. 14B.

DESCRIPTION OF EMBODIMENTS

Figure 1A:
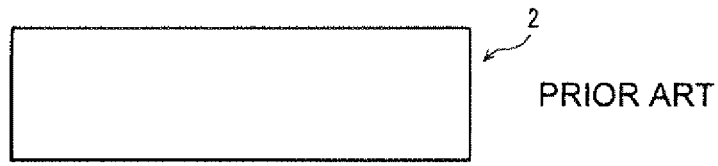
FIG. 1A is a schematic diagram to show a billet in a conventional common production process of a forged crankshaft.
Figure 1B:
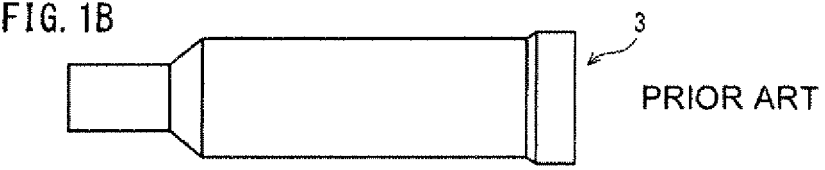
FIG. 1B is a schematic diagram to show a rolled preform in a conventional common production process of a forged crankshaft.
Figure 1C:
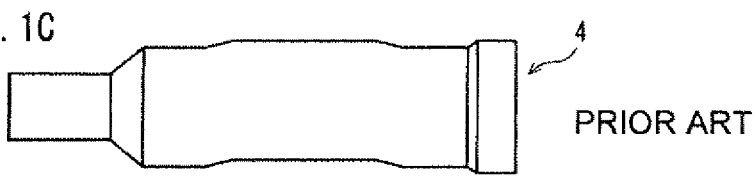
FIG. 1C is a schematic diagram to show a bent preform in a conventional common production process of a forged crankshaft.

Embodiments of the present invention will be described below. It is noted that in the following description, although embodiments of the present invention will be described with some examples, the present invention will not be limited to the examples described below.

The production method of the present embodiment is a method for producing a forged crankshaft. Such a forged crankshaft includes a plurality of journals J which define a rotational center, a plurality of pins P which are decentered with respect to the plurality of journals J, and a plurality of crank arms which connect the plurality of journals J with the plurality of pins P, respectively. At least one of the plurality of crank arms A is a weighted arm AW having a counterweight W. The production method of the present embodiment includes a pressing step and a decentering step.

The pressing step is a step of pressing a first region, which is a part in a longitudinal direction of a bar-like member, with a pair of first dies, to decrease a cross sectional area of the first region. The next decentering step is performed while the first region has been pressed and held by the first dies.

The bar-like member to be pressed in the pressing step is a member which is to be the material for the forged crankshaft. For the bar-like member, a material called a billet as described above may be used.

In the pressing step, the first region may be pressed only once, or it may be pressed multiple times (for example, twice). An example in which the first region is pressed twice is performed as follows. First, the first region of the bar-like member is pressed by the first pressing. As a result pressing, the cross section of the first region is shortened in the pressing direction and elongated in a direction perpendicular to both the pressing direction and the longitudinal direction of the bar-like member. In the subsequent second pressing, the bar-like member is rotated by 90 degrees and the first region is pressed again. For example, when the bar-like member has a circular cross section, the cross section becomes elliptic as the result of the first pressing. The second pressing is performed while the bar-like member is disposed such that the direction of the major axis of the elliptic cross section coincides with the vertical direction (gravity direction). In this way, by performing pressing two times, it is possible to significantly decrease the cross sectional area of the first region.

The decentering step is a step of decentering a second region of the bar-like member with a second die while the pressed first region is held by the first dies. The second region is at least a part of the region of the bar-like member excepting the first region. In other words, a part or all of the region of the bar-like member excepting the first region is the second region. In an example, all of the regions interposed between the first regions is referred to as a second region.

The decentering direction by the second die (decentering direction in the decentering step) is a direction perpendicular to each of the pressing direction by the first dies (pressing direction in the pressing step) and the longitudinal direction of the bar-like member. According to this configuration, it is possible to arbitrarily set a decentering amount by the second die without being affected by the first dies and the material flow in the longitudinal direction. In a typical example, the first dies move in the vertical direction in the pressing step, and the second die moves principally in the horizontal direction in the decentering step.

The second region may include a weighted arm-corresponding part AWC which is to be a weighted arm AW. In the weighted arm AW, the weight W is decentered to the opposite side of the pin P to which the weighted arm AW is adjacent. Since the weight W has a large volume, it is preferable to decenter the weighted arm-corresponding part AWC which is to be the weighted arm AW in the decentering step.

In the weighted arm AW, the counterweight W is decentered in the opposite direction to the pin P to which the weighted arm AW is adjacent. When the second region includes the weighted arm-corresponding part AWC, the production method of the present embodiment may satisfy the following condition (1). According to the below described decentering step, it becomes easy to form the weight W in the subsequent process, thereby improving material yield.

(1) In the decentering step, the second region is decentered in a direction corresponding to the decentering direction of the counterweight W.

Here, the "direction corresponding to the decentering direction of the counterweight W" is equal to the decentering direction of the counterweight W when a twisting process is not provided later. On the other hand, when the twisting process is provided later, the "direction corresponding to the decentering direction of the counterweight W" means a direction closer to the decentering direction of the counterweight W.

When the second region includes a weighted arm-corresponding part AWC, the production method of the present embodiment may further satisfy the following condition (2) and/or (3).

(2) The first region includes a region which is to be a journal J.

(3) The second region includes a pin-corresponding part which is to be a pin P and a weighted arm-corresponding part AWC.

In the condition (2), the first region may include all the journal-corresponding parts. In such a case, it is possible to decenter the second region without decentering the journal-corresponding part in the decentering step.

The production method that satisfies the condition of (3) (for example, conditions (2) and (3)) may further satisfy the following conditions (4) and (5).

(4) In the pressing step, the pin-corresponding part of the bar-like member is pressed by a pair of third dies to decrease the cross sectional area of the pin-corresponding part.

(5) In the decentering step, the pin-corresponding part is decentered while the third dies are moved by the second die with the pin-corresponding part being held by the third dies.

In one throw including a weight W, the pin P and the weight W are decentered in opposite directions. For that reason, in a production method satisfying the above condition (3) (for example, conditions (2) and (3)), it becomes necessary to decenter the pin-corresponding part in an opposite direction to the weighted arm-corresponding part in the process after the decentering step. In such a case, the production method of the present embodiment may satisfy conditions (6) and (7) described below.

(6) The production method of the present embodiment further includes, after the decentering step, a die forging step for forming a rough forged preform by die forging a preform which is formed by the decentering step.

(7) In the die forging step, a rough pin which is to be the pin P is formed in an opposite direction to the decentering direction of the second region in the decentering step, by die forging the second region.

The rough forged preform which is formed in the die forging step has a shape which is substantially equal to or close to that of the forged crankshaft which is the final product. When the above described die forging steps (6) and (7) are performed, flash may be formed in the rough forged preform. In the production method of the present embodiment, sufficient volume distribution is achieved in the decentering step. For that reason, even when flash occur in the above described die forging step, it is possible to decrease the amount of flash compared with a conventional production method.

In a production method which satisfies the above condition (3) (for example, conditions (2) and (3)), the pin-corresponding part may be decentered in a step other than the die forging step.

Hereinafter, an exemplary production method of a forged crankshaft of the present embodiment will be described with reference to the drawings. The embodiments described below are exemplary, and at least part of the configuration of the following embodiment may be replaced by the above described configuration.

1. Exemplary Production Process

A forged crankshaft to be addressed by the production method of the present embodiment includes a journal J which acts as a rotational center, a pin P which is decentered with respect to the journal J, and an arm A which connects the journal J with the pin P. A part or all of the arms A include a weight W. The production method of the present embodiment can be applied to, for example, a 4-cylinder 8-counterweight crankshaft shown in FIG. 1F. Moreover, it can also be applied to the aforementioned 4-cylinder 4-counterweight crankshaft. Besides, it can also be applied to a 3-cylinder engine, a series 6-cylinder engine, a V-type 6-cylinder engine, or an 8-cylinder engine, etc.

The method for producing a forged crankshaft of the present embodiment includes a pressing step and a decentering step. In the pressing step, a part (first region) in the longitudinal direction of a bar-like member is pressed by a pair of first dies, thereby decreasing the cross sectional area of the part. In the decentering step, a part (second region) in the longitudinal direction of a bar-like member is decentered by a second die while the first region which has been pressed by the first dies is held. This makes it possible to facilitate distribution of volume of the bar-like member. The pressing step and the decentering step will be described in detail later.

The processing consisting of the pressing step and the decentering step of the present embodiment corresponds to a preforming in a prior art production process, and more specifically to a preforming consisting of roll forming and bend forging. Although the roll forming and bend forging are performed by different facilities respectively, in the production method of the present embodiment, the processing consisting of the pressing step and the decentering step cay be performed in a single press machine as described below.

The bar-like member which is the workpiece may be, for example, a billet. Alternatively, it may be an initial preform in which the cross sectional area is decreased in a part in the longitudinal direction. The initial preform can be obtained by, for example, subjecting the billet to roll forming, etc.

Figure 1D:
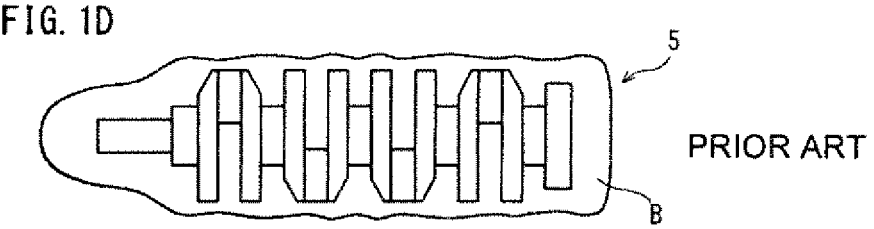
FIG. 1D is a schematic diagram to show a rough forged preform in a conventional common production process of a forged crankshaft.
Figure 1E:
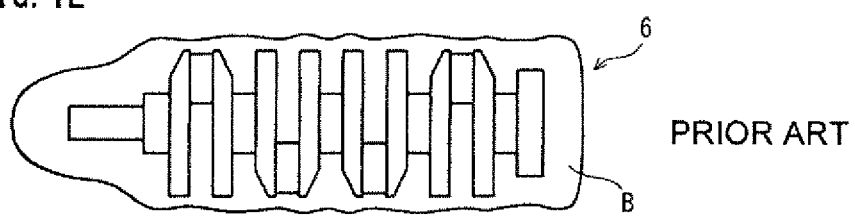
FIG. 1E is a schematic diagram to show a finish forged preform in a conventional common production process of a forged crankshaft.
Figure 1F:
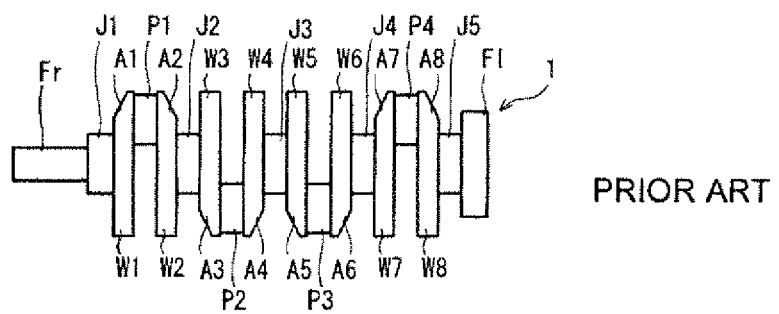
FIG. 1F is a schematic diagram to show a crankshaft in a conventional common production process of a forged crankshaft.

After the preforming, for example, as in the production process shown in FIGS. 1D to 1F, a die forging process and a flash-trimming process can be added and as needed, a coining process can be added after the flash-trimming process. The die forging process may consist of rough forging and finish forging. It is noted that when it is necessary to adjust the layout angle of the pin, a twisting process is added after the flash-trimming process. All of these processes are performed successively as a hot processing.

Alternatively, as the post process of preforming, a process of performing processing by means of a shaping apparatus described in International Application Publication No. WO2014/038183 (Patent Literature 4) may be added. Patent Literature 4 proposes a shaping apparatus for shaping a starting material for finish forged preform from a rough starting material in which a rough shape of the crankshaft is formed. As the rough starting material, a preform obtained by the pressing step and the decentering process is used. In this case, after the process of processing with the above described shaping machine, a finish forging process and a flash-trimming process may be added, and as needed, a coining process may be added. All of these processes are performed successively as a hot processing.

2. Pressing Step and Decentering Step

An exemplary processing flow according to a pressing step and a decentering step will be described with reference to the drawings. The present exemplary processing flow addresses a 4-cylinder 8-counterweight crankshaft.

Figure 2A:
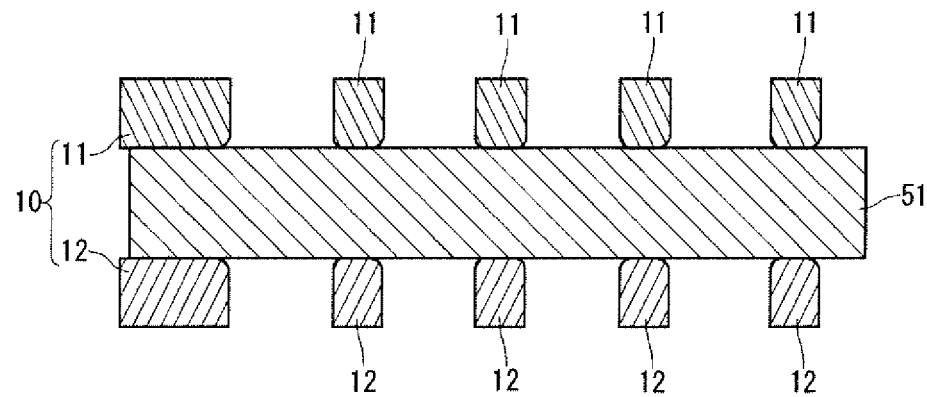
FIG. 2A is a longitudinal sectional view to show a state when pressing is started in an exemplary processing flow according to a pressing step and a decentering step.
Figure 2B:
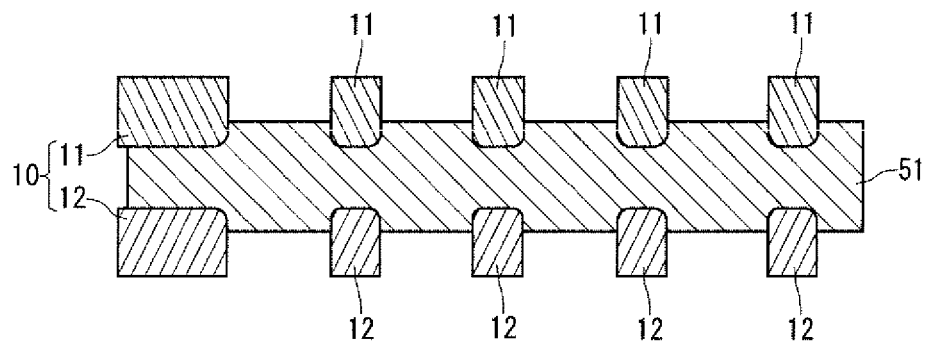
FIG. 2B is a longitudinal sectional view to show a state when pressing is finished in an exemplary processing flow according to a pressing step and a decentering step.

FIGS. 2A to 5B are schematic diagrams to show an exemplary processing flow according to a pressing step and a decentering step. Among those, FIGS. 2A and 2B are longitudinal sectional views, in which FIG. 2A shows a state when pressing is started, and FIG. 2B shows that when pressing is finished. FIGS. 2A and 2B show a bar-like member 51 (billet) and a pair of first dies 10, in which for the sake of clarity of the drawings, a second die which is to be described below is omitted.

Figure 3A:
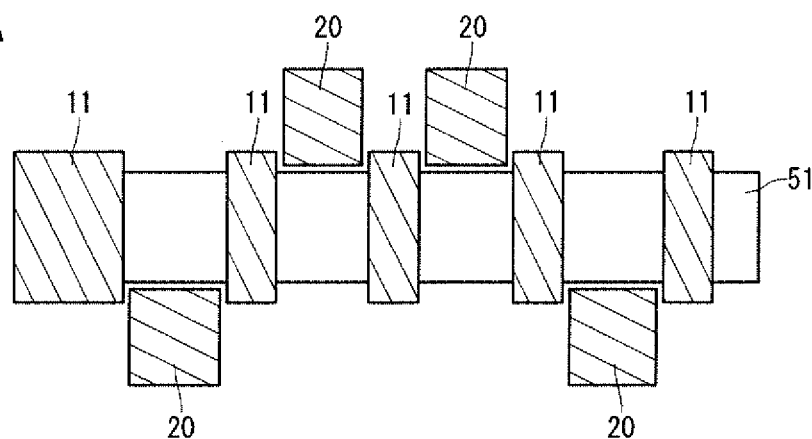
FIG. 3A is a top view to show a state when pressing is finished in an exemplary processing flow according to a pressing step and a decentering step.
Figure 3B:
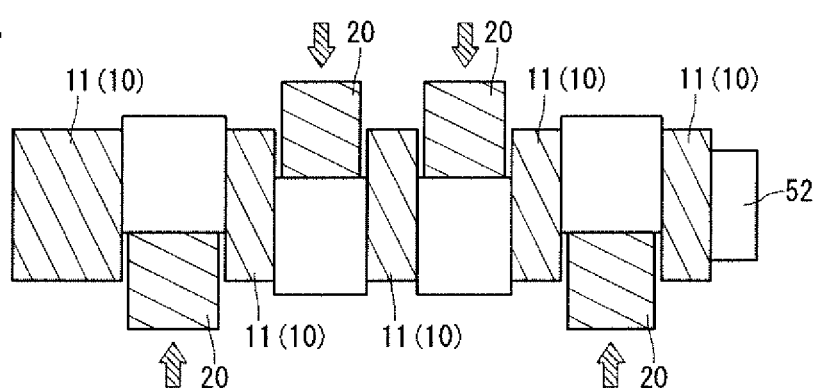
FIG. 3B is a top view to show a state when decentering is finished in an exemplary processing flow according to a pressing step and a decentering step.

FIGS. 3A and 3B are top views, in which FIG. 3A shows a state when pressing is finished and FIG. 3B shows a state when decentering is finished. FIGS. 3A and 3B show a bar-like member 51, a preform 52, a first upper die 11 of the pair of first dies 10, and a second die 20. For the sake of clarity of the drawings, in FIGS. 3A and 3B, the first upper die 11 and the second die 20 are shaded, respectively.

Figure 4A:
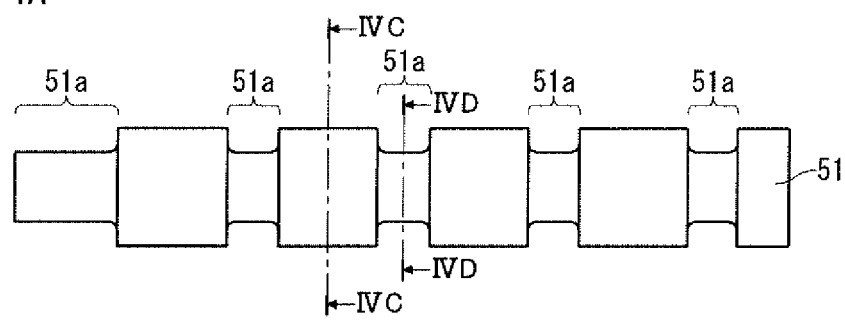
FIG. 4A is a side view to show a bar-like member when pressing is finished in an exemplary processing flow according to a pressing step and a decentering step.
Figure 4B:
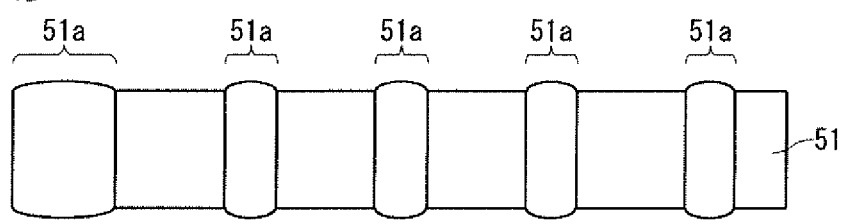
FIG. 4B is a top view of the bar-like member shown in FIG. 4A.
Figure 4C:
FIG. 4C is a IVC-IVC sectional view of FIG. 4A.
Figure 4D:
FIG. 4D is a IVD-IVD sectional view of FIG. 4A.
Figure 5A:
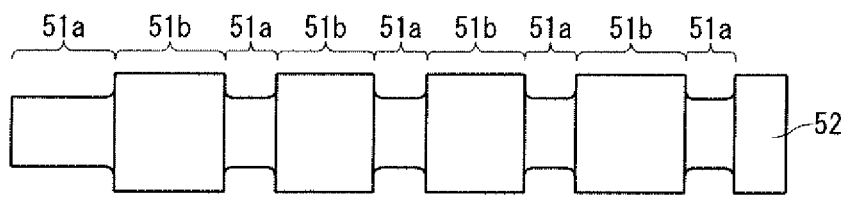
FIG. 5A is a side view to show a bar-like member when decentering is finished in an exemplary processing flow according to a pressing step and a decentering step.
Figure 5B:
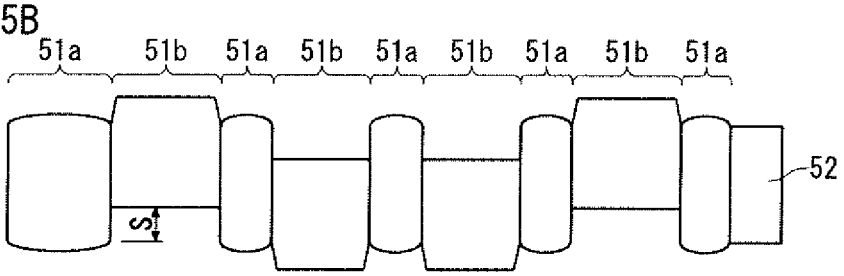
FIG. 5B is a top view of the bar-like member shown in FIG. 5A.
Figure 5B:
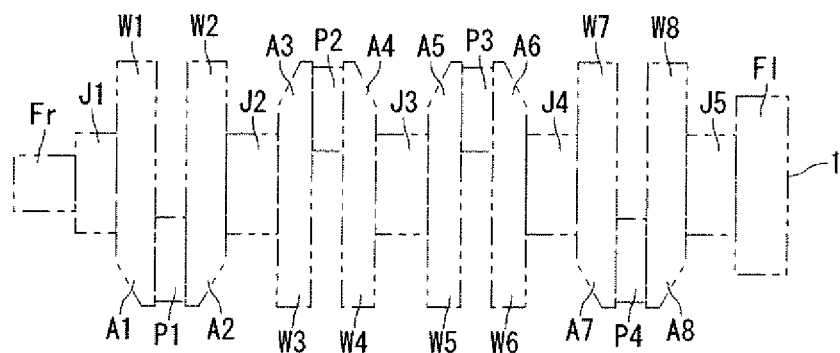

FIGS. 4A to 4D are schematic diagrams to show a bar-like member when pressing is finished, in which FIG. 4A is a side view, FIG. 4B is a top view, FIG. 4C is a IVC-IVC cross sectional view, and FIG. 4D is a IVD-IVD cross sectional view. Moreover, FIGS. 5A and 5B are schematic diagrams to show a bar-like member (preform 52) when decentering is finished, in which FIG. 5A is a side view, and FIG. 5B is a top view. In the lower side of FIG. 5B, the shape of the forged crankshaft 1 is shown by an imaginary line to show the correspondence between each region of the preform 52 and each region of the forged crankshaft (finial product).

In the present exemplary processing flow, the pair of first dies 10 are made up of a first upper die 11 and a first lower die 12. The first upper die 11 is fixed to an upper base plate (not shown) of a press machine and the first lower die 12 is fixed to a lower base plate (not shown) of the press machine.

By using such pair of first dies 10, a part in the longitudinal direction of a bar-like member 51 (billet) is pressed, thereby decreasing the cross sectional area of a first region 51a (hereinafter, also referred to as a "pressed part"). In the present exemplary processing flow, a region which is to be a journal (journal-corresponding part) and a region which is to be a front part (hereinafter, also referred to as a "front-corresponding part") will become a pressed part 51a (see FIGS. 5A and 5B).

The first upper die 11 and the first lower die 12 respectively have a concave die-engraved part for pressing the above described pressed part 51a. The cross sectional shape of the die-engraved part is, for example, parabolic or semi-elliptic.

The first dies 10 have a widely open area at a part in the longitudinal direction of the bar-like member 51. To be more specific, the first dies 10 have an open area in a range corresponding to a region which is not to be pressed (hereinafter, also referred to as a "non-pressed part"). In the present exemplary processing flow, a range corresponding to a region which is to be the pin (pin-corresponding part) and a set of weighted arm-corresponding parts (regions which are to be the arms having a weight) in continuous with the pin-corresponding part is opened. In other words, a range corresponding to the throw-corresponding part is opened. Moreover, a range corresponding to a region which is to be a flange part (hereinafter, also referred to as a "flange-corresponding part") is also opened.

A second die 20 is disposed in at least a part of thus opened range. A second region 51b (hereinafter, also referred to as a "decentered part") against which the second die 20 is pressed, of the bar-like member 51 is decentered by the second die 20. The decentered part 51b is at least a part of the non-pressed part. In the present exemplary processing flow, the decentered part 51b is to be the throw-corresponding part of the non-pressed part (flange-corresponding part and the throw-corresponding part). Further, the second die 20 is movable along a direction (see shaded arrows in FIG. 3B) perpendicular to each of the pressing direction by the first dies 10 and the longitudinal direction of the bar-like member 51.

The pressing step and the decentering step can be performed as follows by using the above described first dies 10 and the second die 20.

As the press machine operates, the first upper die 11 and the first lower die 12 are separated, and the bar-like member 51 having a circular cross sectional area is placed on the first lower die 12. At that time, the second die 20 is retreated to prevent interference with the bar-like member 51.

Next, in the pressing step, as the press machine operates, the first upper die 11 is moved down so that the bar-like member 51 is brought into abutment with the first upper die 11, thus starting the pressing by the first dies 10 (see FIG. 2A). As the first upper die 11 is further moved down, due to pressing effect by the first dies 10, the cross sectional area of a part in the longitudinal direction of the bar-like member 51 (the aforementioned pressed part 51a) is decreased. The first upper die 11 is further moved down to reach a bottom dead center, thus finishing pressing (see FIGS. 2B and 3A). As a result, the cross sectional shape of the pressed part 51a is deformed from a circular shape into a flattened shape (see FIG. 4D).

When the cross sectional area is decreased in the pressed part 51a, the material of the pressed part 51a flows into a non-pressed part without flowing out as flash. As a result, the cross sectional area of the aforementioned non-pressed part increases, and the volume of the bar-like member 51 is distributed in the longitudinal direction (see FIGS. 4A to 4D).

In the decentering step, by maintaining the position of the first upper die 11 at a bottom dead center, the pressed part 51a of the bar-like member 51 is interposed and held between the pair of the first dies 10. In this state, the second die 20 is moved to press against the bar-like member 51 (see FIG. 3B), thereby decentering the aforementioned decentered part 51b (see FIG. 5B). As a result, the distribution of volume can be facilitated. In this way, a preform 52 as shown in FIGS. 5A and 5B is formed.

After decentering, the second die 20 is retreated, and the first upper die 11 is moved upward. In this state, the preform 52 is taken out and is conveyed to the next process.

In the method for producing a forged crankshaft of the present embodiment which can adopt such an exemplary processing flow, the cross sectional area of the pressed part 51a is decreased by the first dies 10 in the pressing step, and the decentered part 51b is decentered by the second die 20 in the decentering step. This can facilitate distribution of volume.

Moreover, in the decentering step, since the pressed part 51a of the bar-like member 51 is held by the first dies 10, it is possible to suppress material flow from the decentered part 51b to the pressed part Sla. For this reason, even if the cross sectional area of the pressed part 51a is significantly decreased in the pressing step, it is possible to prevent occurrence of overlap defects in the decentering step. This can also facilitate distribution of volume.

Thus, since the method for producing a forged crankshaft of the present embodiment can facilitate the distribution of volume in the preforming, it becomes possible to decrease the flowing out of flash during rough forging and finish forging, which are post processes, thus improving material yield.

As described above, pressing by the pair of first dies 10 can be implemented by a press machine. The operation of the second die 20 can be implemented by for example a wedge mechanism described below, or a hydraulic cylinder, etc. For this reason, for the pressing step and the decentering step, an existing press machine can be utilized, and a special facility such as one in a cross rolling method is unnecessary. Therefore, it is possible to suppress increase in facility cost.

Moreover, as in the above described exemplary processing flow, it is possible to perform the pressing step and the decentering step within one stroke (one reciprocating motion) of the press machine. For that reason, it is possible to improve material yield while maintaining or improving production efficiency.

As in the present exemplary processing flow, it is preferable that the first region 51a (pressed part) which is to be pressed by the first dies includes a journal-corresponding part, and the second region 51b (decentered part) which is to be decentered by the second die includes a pin-corresponding part and a weighted arm-corresponding part. This makes it possible to decrease the cross sectional area of the journal-corresponding part and also to decenter the throw-corresponding part, in the preforming. Thus, it is possible to further facilitate the distribution of volume in preforming.

When the decentered part 51b includes the pin-corresponding part and the weighted arm-corresponding part, that is, the throw-corresponding part, it is preferable that the decentered part 51b is decentered to the side of the region which is to be the weight (opposite side of the pin-corresponding part) (see FIG. 5B). Here, in the crankshaft (final product), it is often the case that the cross sectional area of the weight is larger than that of the pin. In such a case, decentering the decentered part 51b toward the region which is to be the weight ensures volume in the region which is to be the weight while suppressing the volume of the pin-corresponding part. As a result, material yield can be improved.

In view of further facilitating the distribution of volume in the preforming, it is more preferable that the pressed part 51a includes the front-corresponding part. When the forged crankshaft includes the weightless arm, it is preferable that the pressed part 51a includes a region which is to be the weightless arm in view of further facilitating the distribution of volume in preforming.

In the pressing step, it is preferable that the pin-corresponding part is pressed by a pair of third dies to decrease the cross sectional area of the pin-corresponding part. In this case, in the decentering step, while the pin-corresponding par is held by the third dies, the pin-corresponding part may be decentered by the second die while the third dies are being moved. An exemplary processing flow by use of third dies will be described with reference to the drawings.

Figure 6A:
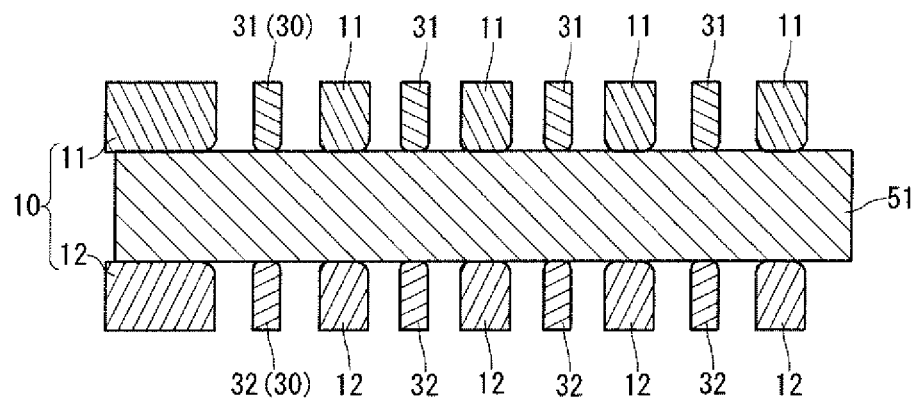
FIG. 6A is a longitudinal sectional view to show a state when pressing is started in an exemplary processing flow using third dies.

FIGS. 6A to 9B are schematic diagrams to show an exemplary processing flow by use of third dies. FIGS. 6A and 6B among those are longitudinal sectional views, in which FIG. 6A shows a state when pressing is started, and FIG. 6B shows a state when pressing is finished. Moreover, FIGS. 7A and 7B are top views, in which FIG. 7A shows a state when pressing is finished, and FIG. 7B shows a state when decentering is finished. In FIGS. 6A to 7B, a pair of third dies 30 are added compared with in FIGS. 2A to 3B described above. For the sake of clarifying the drawings, first upper dies 11, second dies 20, and third upper dies 31 are shown to be shaded, respectively in FIGS. 7A and 7B.

Figure 8A:
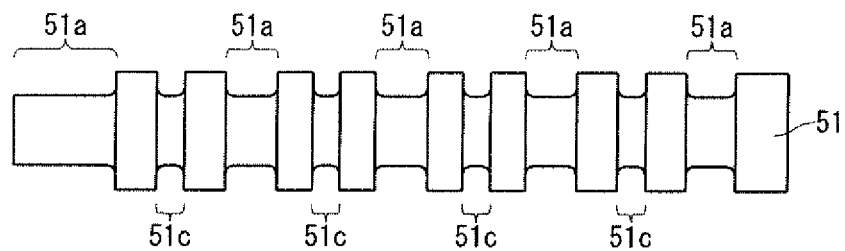
FIG. 8A is a side view to show a bar-like member when pressing is finished in an exemplary processing flow using third dies.
Figure 8B:
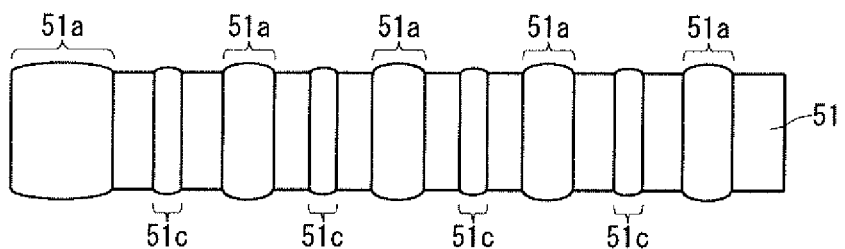
FIG. 8B is a top view to show a bar-like member shown in FIG. 8A.
Figure 9A:
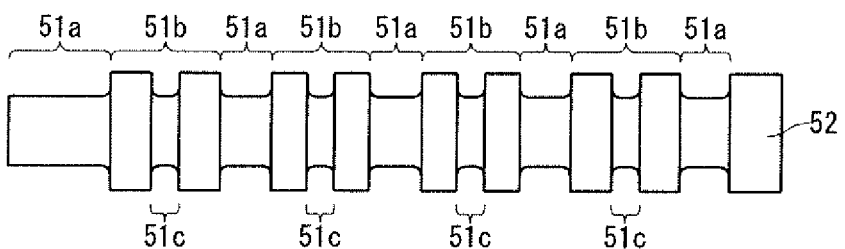
FIG. 9A is a side view to show a bar-like member when decentering is finished in an exemplary processing flow using third dies.
Figure 9B:
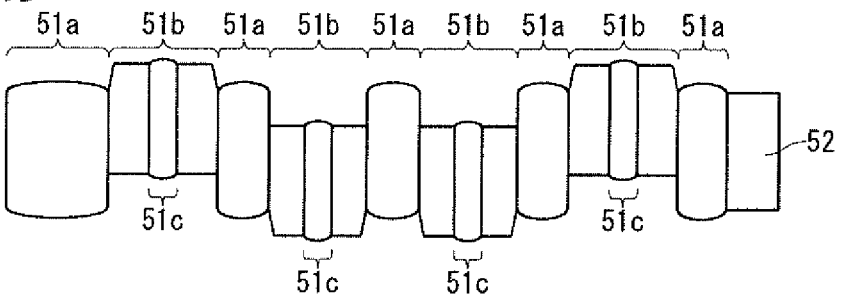
FIG. 9B is a top view to show the bar-like member shown in FIG. 9A.
Figure 9B:
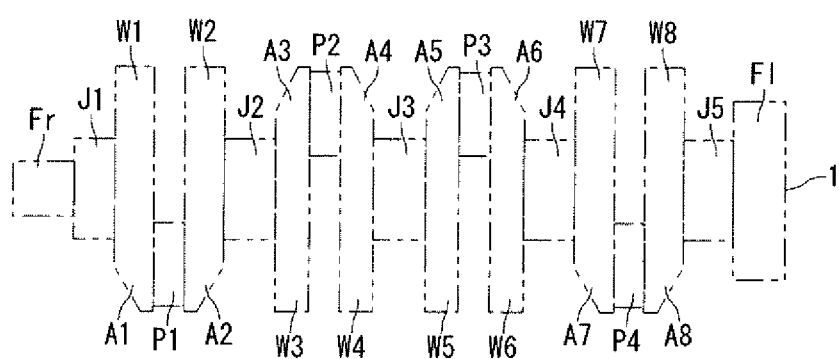

FIGS. 8A and 8B are schematic diagrams to show a bar-like member when decentering is finished in the exemplary processing flow by use of third dies, in which FIG. 8A is a side view and FIG. 8B is a top view. Further, FIGS. 9A and 9B are schematic diagrams to show the bar-like member (preform 52) when decentering is finished in the exemplary processing flow by use of third dies, in which FIG. 9A is a side view and FIG. 9B is a top view.

In the present exemplary processing flow, a pair of third dies 30 consist of a third upper die 31 and a third lower die 32. The third upper die 31 is held at an upper base plate (not shown) of the press machine, and the third lower die 32 is held at a lower base plate (not shown) of the press machine. As a result, in the pressing step, as the press machine operates, it is possible to press the pin-corresponding part 51c with the third dies 30 in the same direction as the pressing direction by the first dies 10. The third upper die 31 and the third lower die 32 are each held so as to be movable along a direction perpendicular to each of the pressing direction by the first dies 10 and the longitudinal direction of the bar-like member 51 (see shaded arrows in FIG. 7B). Along with this movement, in the decentering step, the pin-corresponding part 51c is decentered. In this way, the preform 52 is formed.

The third upper die 31 and the third lower die 32 each have a concave die-engraved part for pressing the pin-corresponding part 51c. The cross sectional shape of that die-engraved part is, for example, parabolic or semi-elliptic.

Figure 6B:
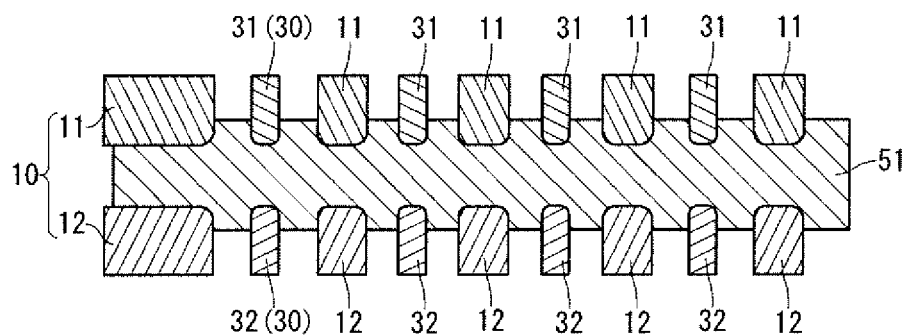
FIG. 6B is a longitudinal sectional view to show a state when pressing is finished in an exemplary processing flow using third dies.
Figure 7A:
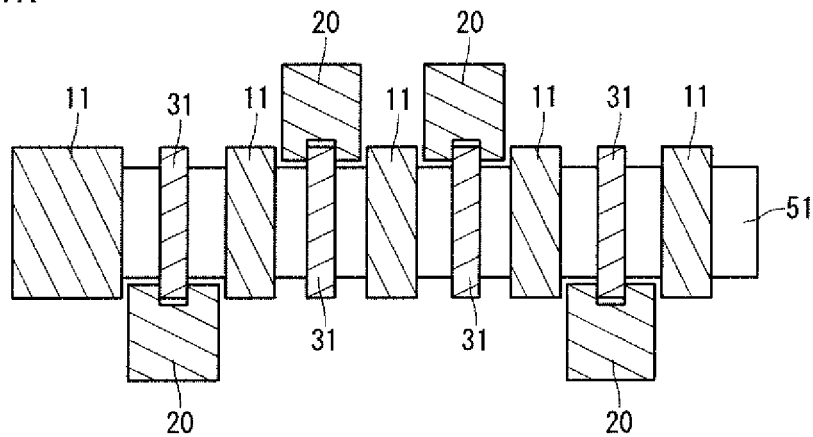
FIG. 7A is a top view to show a state when pressing is finished in an exemplary processing flow using third dies.

In the pressing step in which the third dies 30 are used, as the press machine operates, the third upper die 31 is moved downward along with the first upper die 11 so that the first upper die 11 and the third upper die 31 reach a bottom dead center (see FIGS. 6B and 7A). In that occasion, the pressed part 51a (the journal-corresponding part and the front-corresponding part) of the bar-like member 51 is pressed by the first dies 10, thereby decreasing the cross sectional areas of those regions. In addition, the pin-corresponding part 51c of the bar-like member 51 is pressed by the third dies 30, thereby decreasing the cross sectional areas of the pin-corresponding part 51c. As a result, the cross sectional shape of the pin-corresponding part 51c of the bar-like member 51 is deformed from a circular shape to a flattened shape as in the journal-corresponding part shown in FIG. 4D.

The first upper die 11 and the third upper die 31 do not necessarily need to move downward concurrently. For example, the third upper die 31 may move downward after the first upper die 11 moves downward to the bottom dead center, first. This is effective to suppress increase in required load caused by interference between the material pressed by the first upper die 11 and pushed out in the axial direction and the material pressed by the third upper die 31 and pushed out therefrom.

In the decentering step, by maintaining the positions of the first upper die 11 and the third upper die 31 at the bottom dead center, the journal-corresponding part and the front-corresponding part of the bar-like member 51 are held by a pair of first dies 10, and the pin-corresponding part 51c of the bar-like member 51 is held by a pair of third dies 30. In this state, the second die 20 is moved to press against the bar-like member 51, thereby decentering the decentered part 51b (the pin-corresponding part 51c and the weighted arm-corresponding part) (see FIG. 7B). In that occasion, since the pin-corresponding part 51c is held by a pair of third dies 30, third dies 30 is interposed between a second die 20 and the bar-like member 51. Moreover, being pressed by the second die 20, the pin-corresponding part 51c of the bar-like member 51 is decentered while the third dies 30 are moving. In this way, the preform 52 is formed.

Thus, using a pair of third dies 30 makes it possible to decenter the pin-corresponding part 51c while the cross sectional area of the pin-corresponding part 51c is kept decreased. Further, in the decentering step, since the pin-corresponding part 51c is held by a pair of third dies, it is possible to prevent material flow from the weighted arm-corresponding part to the pin-corresponding part 51c. Therefore, it is possible to further facilitate the distribution of volume.

The operation of the second die 20 can be implemented by, for example, a wedge mechanism to be described below, or a hydraulic cylinder, etc. In view of operating the second die reliably in synchronous with the reciprocating motion of the press machine, and realizing high speed operation, it is preferable to operate the second die by a wedge mechanism. Hereinafter, an exemplary configuration in which the second die is operated by a wedge mechanism will be described with reference to the drawings.

Figure 10A:
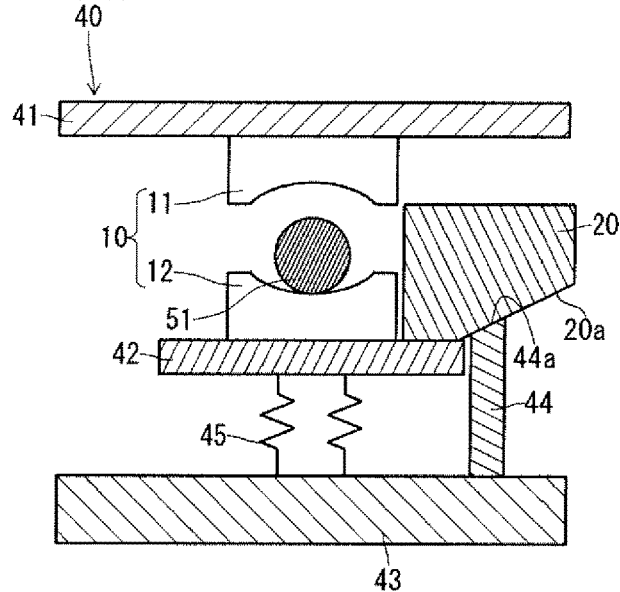
FIG. 10A is a cross sectional view to show a state before pressing in an exemplary configuration utilizing a wedge mechanism.
Figure 10B:
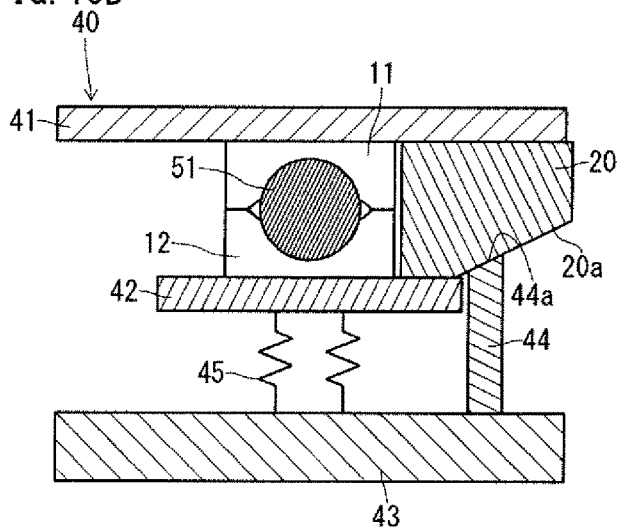
FIG. 10B is a cross sectional view to show a state when pressing is finished in an exemplary configuration utilizing a wedge mechanism.
Figure 10C:
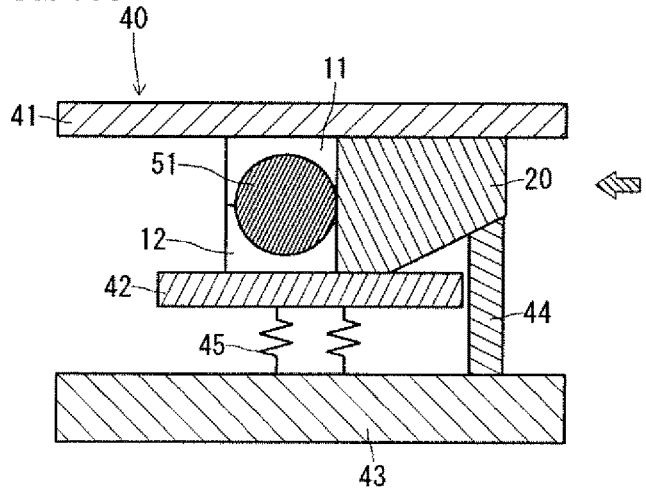
FIG. 10C is a cross sectional view to show a state when a second die is operated in an exemplary configuration utilizing a wedge mechanism.

FIGS. 10A to 10C are cross sectional views to schematically show an exemplary configuration in which the second die is operated by a wedge mechanism, in which FIG. 10A shows a state before pressing, FIG. 10B shows a state when pressing is finished, and FIG. 10C shows a state in which the second die is operated, respectively. FIGS. 10A to 10C show a part of a press machine 40, a bar-like member 51 (billet), a pair of first dies 10, a second die 20, and a wedge 44. The press machine 40 includes a bed 43, an upper base plate 41 which reciprocally moves upward and downward, a lower base plate 42, and an elastic member 45 (for example, a spring). The lower base plate 42 is held so as to be movable upward and downward by the bed 43 via the elastic member 45.

The first upper die 11 of the first dies 10 is fixed to the upper base plate 41, and the first lower die 12 is fixed to the lower base plate 42. The second die 20 is held by the lower base plate 42 so as to be movable along a direction perpendicular to the pressing direction of the first dies (the horizontal direction in the present exemplary configuration). A part of the bottom surface of the second die 20 is an inclined surface 20a, and the height of the inclined surface 20a increases as moving away from the first dies 10. The wedge 44 extends in the up and down directions, and a lower end of the wedge 44 is fixed to the bed 43. Moreover, the upper surface of the wedge 44 is an inclined surface 44a, and the height of the inclined surface 44a increases as moving away from the first dies 10.

When such an exemplary configuration is adopted, in the pressing step, the first upper die 11 moves down as the upper base plate 41 moves down. As the result, the bar-like member 51 is pressed by the pair of first dies 10. Since the spring constant etc. of the elastic member 45 is appropriately adjusted based on the load applied to the lower base plate 42 during the pressing procedure, the elastic member 45 in the pressing procedure will not contract much. For this reason, since the lower base plate 42 hardly moves down in the pressing procedure, the second die 20 also hardly moves in the horizontal direction.

Moving the upper base plate 41 further downward brings a die-parting plane of the first upper die 11 and a die-parting plane of the first lower die 12 into abutment with each other, and thus pressing is finished (see FIG. 10B). After pressing is finished, moving the upper base plate 41 further downward will result in significant increase in the load to be applied to the lower base plate 42 compared with in the pressing procedure, thus causing contraction of the elastic member 45 (see FIG. 10C). As a result, the first upper die 11, the first lower die 12, and the second die 20 move downward. In this occasion, the inclined surface 20a of the second die 20 is pressed by the inclined surface 44a of the wedge 44, and the second die 20 moves in the horizontal direction (see a shaded arrow in FIG. 10C). As a result, the second die 20 is pressed against the bar-like member 51, thereby decentering a part of the bar-like member 51. In this way, adopting a wedge mechanism makes it possible to operate the second die as the upper base plate 41 moves reciprocally.

In the aforementioned exemplary processing flow and the exemplary configuration using the wedge mechanism, after the pressing by the pair of first dies 10 is finished, the decentering by the second die 20 is started. In the method for producing a forged crankshaft of the present embodiment, the decentering by the second die 20 may be started in a last stage of the pressing by the pair of first dies 10. In other words, in the last stage of the pressing step, the decentering step may be started.

When the decentering step is started in the last stage of the pressing step, it is preferable that the moving distance of the first dies when the decentering step is started is 75% or more to less than 100%. Here, the moving distance of the first dies is a distance (mm) at which either one of the first upper die or the first lower die has moved with respect to the other, with the distance being 0% when the pressing is started, and 100% when the pressing is finished. If the movement distance of the first dies is not less than 75% when the decentering step is started, holding of the bar-like member 51 by the first dies 10 becomes sufficient, and a die space configured by the die-engraved part of the first upper die 11 and the die-engraved part of the first lower die 12 is sufficiently small, thus making it possible to reliably suppress the material flow from the decentered part to the pressed part.

In view of decreasing the facility load, it is preferable to start the decentering step after finishing the pressing step, as in the aforementioned exemplary processing flow and the exemplary configuration using the wedge mechanism. This is because, the energy for pressing by the first dies and the energy for horizontal movement of the second die are required at the same time, thus causing increase in the facility capacity.

In the aforementioned exemplary processing flow and the exemplary configuration using the wedge mechanism, the shape of the region that comes into abutment with the bar-like member 51 is made flat shapes, and as a result, a stair-like step S is formed at the boundary between the pressed part 51a and the decentered part 51b (see FIG. 5B). The height of the step S becomes the decentering amount of the decentered part 51b. In the method for producing a forged crankshaft of the present embodiment, the step S may be removed at the boundary between the pressed part 51a and the decentered part 51b. In other words, the decentering amount may be gradually changed in the area around the boundary between the pressed part 51a and the decentered part 51b. For example, by appropriately changing the shape of the second die 20 (the region in abutment with the bar-like member 51), it is made possible to remove the step S.

Figure 7B:
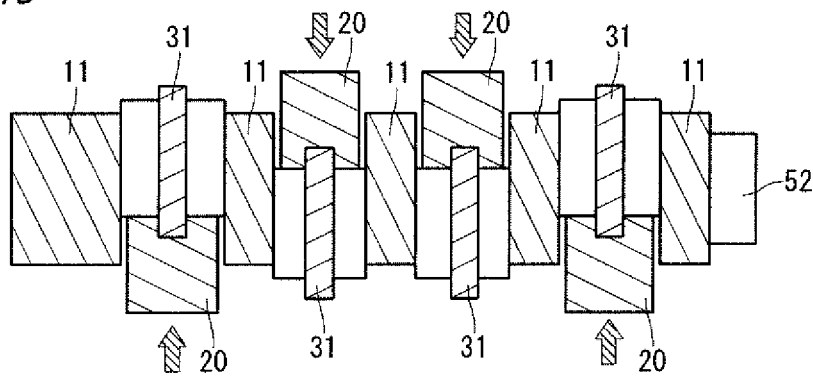
FIG. 7B is a top view to show a state when decentering is finished in an exemplary processing flow using third dies.

In the aforementioned exemplary processing flow, the second die 20 is moved along the direction perpendicular to each of the pressing direction by the first dies 10 and the longitudinal direction of the bar-like member 51 (see shaded arrows in FIGS. 3B and 7B). The moving direction of the second die 20, that is, the direction in which the decentered part 51b of the bar-like member is decentered may be appropriately set according to, for example, the shape of the forged crankshaft (product shape).

Figure 11:
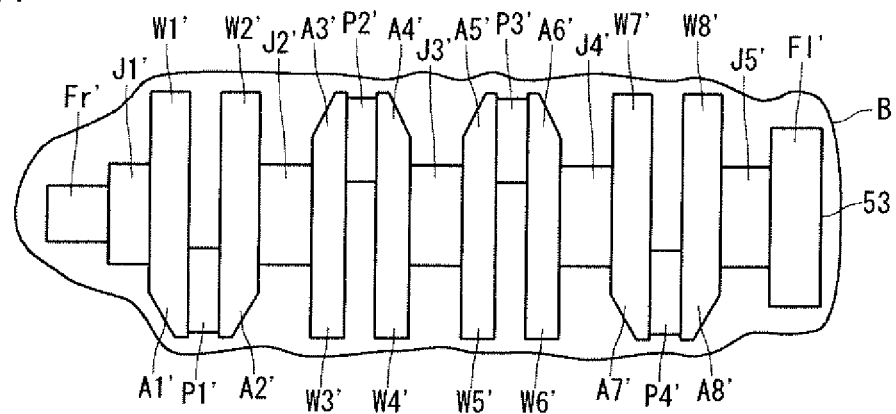
FIG. 11 is a top view to show an exemplary rough forged preform which is formed by a die-forging step.

The preform which has been formed by the above described decentering step may be die-forged at the above described condition (7). For example, in the die forging step, a rough pin which is to be the pin P may be formed in an opposite direction to the decentering direction of the decentered part 51b by die forging the second region (decentered part 51b) of the preform 52 shown in FIG. 5B. A rough forged preform 53 which is formed by such die-forging step is shown in FIG. 11I. FIG. 11 is a top view of the rough forged preform 53, in which the arranging direction of the rough forged preform 53 in FIG. 11 and the arranging direction of the preform 52 in FIG. 5B are the same.

The rough forged preform 53 of FIG. 11 can be obtained by die forging the preform 52 shown in FIG. 5B. The rough forged preform 53 includes rough journals J1' to J5' corresponding to journals J1 to J5, rough pins P1' to P4' corresponding to pins P1 to P4, rough arms A1' to A8' corresponding to arms A1 to A8, rough counterweights W1' to W8' corresponding to counterweights W1 to W8, a rough front part Fr' corresponding to a front part Fr, and a rough flange part Fl' corresponding to a flange part Fl. In each throw, the decentering direction of the rough pin and that of the rough counterweight are opposite to each other. In other words, the decentering direction of a rough counterweight is opposite to that of the rough pin to which the rough arm having the counterweight is adjacent.

The die forging for forming a rough forged preform 53 from a preform 52 can be performed by a common die forging which generates flash B. Even when flash B are generated, by performing in advance the decentering step that moves material to the counterweight W side, it is possible to improve material yield. By subjecting the rough forged preform 53 to predetermined processes (for example, finish forging and flash-trimming processes), it is possible to obtain a forged crankshaft 1 shown by a dotted line in FIG. 9B. It is noted that the preform 52 shown in FIG. 9B may be die-forged in a similar manner.

In the above described example, a 4-cylinder 8-counterweight forged crankshaft has been illustrated. As described above, the production method of the present embodiment can be applied to production of other types of forged crankshafts. For example, it can be applied to production method of a forged crankshaft including an arm A having no weight W. As such an example, production of a 4-cylinder 4-counterweight forged crankshaft will be described with reference to FIGS. 12A to 12C.

Figure 12A:
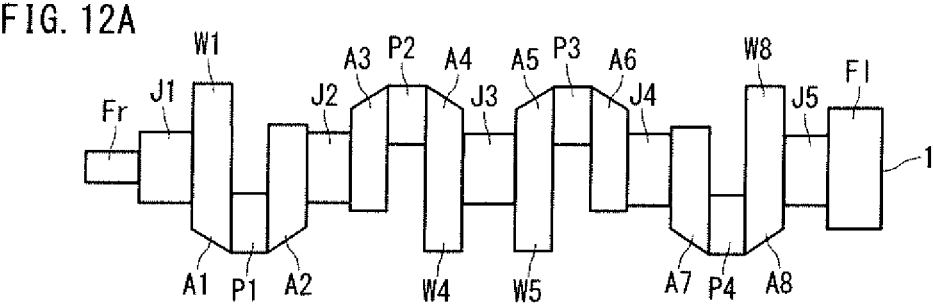
FIG. 12A is a schematic diagram to show another exemplary forged crankshaft which is produced by the production method of the present embodiment.

FIG. 12A is a top view of a 4-cylinder 4-counterweight forged crankshaft 1. In the forged crankshaft 1 shown in FIG. 12A, the arms A1, A4, A5, and A8 respectively have weights W1, W4, W5, and W8. Other arms have no weight, and cross sections thereof are, for example, elliptic.

Figure 12B:
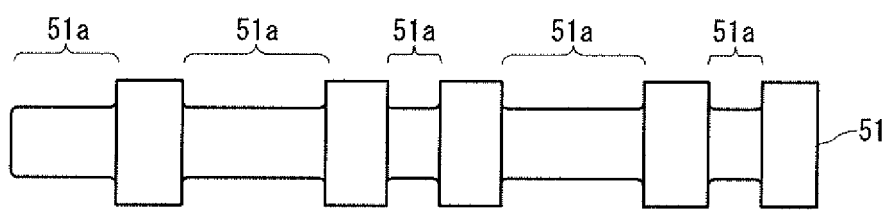
FIG. 12B is a schematic diagram to show an exemplary bar-like member which has been pressed in the production process of a forged crankshaft shown in FIG. 12A.

In the production of the forged crankshaft 1 shown in FIG. 12A as well, the above described pressing step and decentering step are performed. FIG. 12B is a side view corresponding to FIG. 4A, showing the shape of the bar-like member 51 when the pressing step is finished. In the pressing step, the first region (pressed part 51a) is pressed. The pressed part 51a in this example may include a weightless arm-corresponding part and a journal-corresponding part, and further include at least a part of a pin-corresponding part.

Figure 12C:
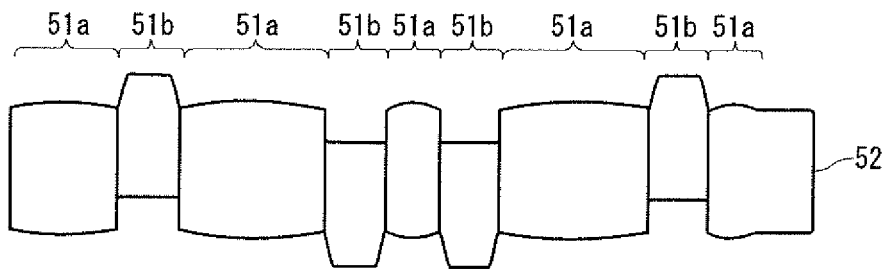
FIG. 12C is a schematic diagram to show an exemplary preform 52 obtained by decentering the bar-like member shown in FIG. 12B.

In the next decentering step, as shown in FIG. 12C, a preform 52 is formed by decentering the second region (decentered part 51b). FIG. 12C is a top view corresponding to FIG. 5B. The decentered part 51b in this example includes a weighted arm-corresponding part. In this way, a preform 52 for producing the (4-cylinder 4-counterweight) forged crankshaft 1 is obtained.

Another example of producing the 4-cylinder 4-counterweight forged crankshaft 1 as shown in FIG. 12A will be described with reference to FIGS. 13A and 13B. In this example as well, the above described pressing step and decentering step are performed.

Figure 13A:
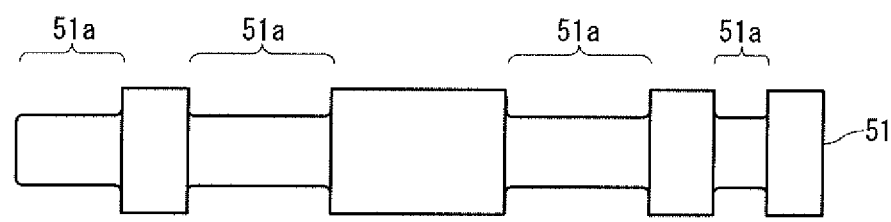
FIG. 13A is a schematic diagram to show another exemplary bar-like member which has been pressed in the production process of a forged crankshaft shown in FIG. 12A.

FIG. 13A is a side view corresponding to FIG. 4A, showing the shape of the bar-like member 51 when the pressing step is finished. In the pressing step, the first region (pressed part 51a) is pressed. The first region in this example may include a weightless arm-corresponding part and a journal-corresponding part, and further include at least a part of a pin-corresponding part. This first region does not include a portion which is to be the journal J3 of the journal-corresponding part.

Figure 13B:
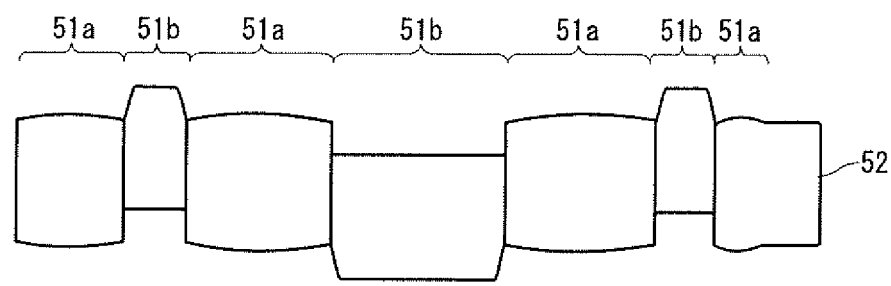
FIG. 13B is a schematic diagram to show another exemplary preform 52 which is obtained by decentering the bar-like member shown in FIG. 13A.

In the next decentering step, as shown in FIG. 13B, a preform 52 is formed by decentering the second region (decentered part 51b). FIG. 13B is a top view corresponding to FIG. 5B. The decentered part 51b in this example includes a weighted arm-corresponding pat and a journal-corresponding part which is to be the journal J3. In this way, a preform 52 for a 4-cylinder 4-counterweight forged crankshaft 1 is obtained.

Another example of producing a 3-cylinder 4-counterweight forged crankshaft will be described with reference to FIGS. 14A to 14C. FIG. 14A is a top view of a 3-cylinder 4-counterweight forged crankshaft 1. In the forged crankshaft 1 shown in FIG. 14A, the arms A1, A2, A5, and A6 respectively have weights W1, W2, W5, and W6. The arms A3 and A4 have no weight, and cross sections thereof are, for example, elliptic. The pin P2 located between the arm A3 and the arm A4 is decentered in a direction perpendicular to the page surface.

In the production of the forged crankshaft 1 shown in FIG. 14A as well, the above described pressing step and decentering step are performed. FIG. 14B is a side view corresponding to FIG. 4A, showing the shape of the bar-like member 51 when the pressing step is finished. In the pressing step, the first region (pressed part 51a) is pressed. The pressed part 51a in this example includes a weightless arm-corresponding part, a pin-corresponding part interposed between the weightless arm-corresponding parts, and a journal-corresponding part.

In the next decentering step, as shown in FIG. 14C, a preform 52 is formed by decentering the second region (decentered part 51b). FIG. 14C is a top view corresponding to FIG. 5B. The decentered part 51b in this example includes a weighted arm-corresponding pat and a pin-corresponding part interposed between the weighted arm-corresponding parts. In this way, a preform 52 for the 3-cylinder 4-counterweight forged crankshaft 1 is obtained.

INDUSTRIAL APPLICABILITY

The present invention can be effectively used for producing a forged crankshaft to be mounted on a reciprocating engine.

REFERENCE SIGNS LIST

1: Forged crank shaft,
10: First dies,
11: First upper die,
12: First lower die,
20: Second die,
20a: Inclined surface,
30: Third dies,
31: Third upper die,
32: Third lower die,
40: Press machine,
41: Upper base plate,
42: Lower base plate,
43: Bed,
44: Wedge,
44a: Inclined surface,
45: Elastic member,
51: Bar-like member,
51a: First region (pressed part),
51b: Second region (decentered part),
51: Region to become pin (pin-corresponding part),
52: Preform,
A, A1 to A8: Crank arms,
B: Flash,
J, J1 to J5: Journals,
P, P1 to P4: Pins,
Fr: Front part,
F1: Flange part, and
W, W1 to W8: Counterweights.

The invention claimed is:

1. A method for producing a forged crankshaft including a plurality of journals which define a rotation center, a plurality of pins which are decentered with respect to the plurality of journals, and a plurality of crank arms which connect the plurality of journals with the plurality of pins, respectively, wherein
at least one of the plurality of crank arms is a weighted arm having a counterweight,
the production method comprising:
a pressing step of pressing a first region, which is a part in a longitudinal direction of a bar-like member, with a pair of first dies, to decrease a cross sectional area of the first region, wherein a cross sectional shape of the first region is deformed into a flattened shape compared with a cross sectional shape of the bar like member excepting the first region; and
a decentering step of decentering a second region of the bar-like member with a second die while the pressed first region is held by the first dies, wherein
the second region is at least a part of a region of the bar-like member excepting the first region,
the decentering direction by the second die is a direction perpendicular to each of the pressing direction by the first dies and the longitudinal direction of the bar-like member,
the first region includes a region which is to be the journal, and
the second region includes a pin corresponding part which is to be the pin.

2. The method for producing a forged crankshaft according to claim 1, wherein
the second region further includes a weighted arm-corresponding part which is to be the weighted arm.

3. The method for producing a forged crankshaft according to claim 2, wherein
in the weighted arm, the counterweight is decentered in an opposite direction to the pin to which the weighted arm is adjacent, and
in the decentering step, the second region is decentered in a direction corresponding to the decentering direction of the counterweight.

4. The method for producing a forged crankshaft according to claim 1, wherein
in the pressing step, the pin-corresponding part of the bar-like member is pressed by a pair of third dies to decrease a cross sectional area of the pin-corresponding part, and
in the decentering step, the pin-corresponding part is decentered while the third dies are moved with the second die with the pin-corresponding part being held by the third dies.

5. The method for producing a forged crankshaft according to claim 3, wherein
in the pressing step, the pin-corresponding part of the bar-like member is pressed by a pair of third dies to decrease a cross sectional area of the pin-corresponding part, and
in the decentering step, the pin-corresponding part is decentered while the third dies are moved with the second die with the pin-corresponding part being held by the third dies.

6. The method for producing a forged crankshaft according to claim 1, wherein a cross sectional shape of the bar-like member perpendicular to the longitudinal direction is a circular shape.

7. A method for producing a forged crankshaft including a plurality of journals which define a rotation center, a plurality of pins which are decentered with respect to the plurality of journals, and a plurality of crank arms which connect the plurality of journals with the plurality of pins, respectively, wherein
at least one of the plurality of crank arms is a weighted arm having a counterweight,
the production method comprising:
a pressing step of pressing a first region, which is a part in a longitudinal direction of a bar-like member, with a pair of first dies, to decrease a cross sectional area of the first region; and
a decentering step of decentering a second region of the bar-like member with a second die while the pressed first region is held by the first dies, wherein
the second region is at least a part of a region of the bar-like member excepting the first region, and
the decentering direction by the second die is a direction perpendicular to each of the pressing direction by the first dies and the longitudinal direction of the bar-like member,
the second region includes a weighted arm-corresponding part which is to be the weighted arm,
the first region includes a region which is to be the journal,
the second region includes a pin-corresponding part which is to be the pin, and the weighted arm-corresponding part,
in the pressing step, the pin-corresponding part of the bar-like member is pressed by a pair of third dies to decrease a cross sectional area of the pin-corresponding part, and
in the decentering step, the pin-corresponding part is decentered while the third dies are moved with the second die with the pin-corresponding part being held by the third dies.

* * * * *